(12) United States Patent
Liu

(10) Patent No.: US 12,170,914 B2
(45) Date of Patent: Dec. 17, 2024

(54) DOWNLINK TRANSMISSION DETECTING METHOD AND DEVICE, CONFIGURATION INFORMATION TRANSMISSION METHOD AND DEVICE, AND DOWNLINK TRANSMISSION METHOD AND DEVICE

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 504 days.

(21) Appl. No.: 17/425,719

(22) PCT Filed: Jan. 30, 2019

(86) PCT No.: PCT/CN2019/073979
§ 371 (c)(1),
(2) Date: Jul. 23, 2021

(87) PCT Pub. No.: WO2020/154974
PCT Pub. Date: Aug. 6, 2020

(65) Prior Publication Data
US 2022/0256372 A1    Aug. 11, 2022

(51) Int. Cl.
*H04W 24/08*    (2009.01)
*H04L 5/00*    (2006.01)
(Continued)

(52) U.S. Cl.
CPC .......... *H04W 24/08* (2013.01); *H04L 5/0051* (2013.01); *H04W 72/0446* (2013.01); *H04W 72/0453* (2013.01); *H04W 72/23* (2023.01)

(58) Field of Classification Search
CPC ..... H04W 24/08; H04W 24/10; H04W 28/00; H04W 28/02; H04W 72/0446;
(Continued)

(56) References Cited

U.S. PATENT DOCUMENTS 10,609,632 B2 *    3/2020    Li ..................... H04W 72/0453
2008/0085706 A1 *    4/2008    Nagata ................... G08B 21/24
455/435.1

(Continued)

FOREIGN PATENT DOCUMENTS

CN    104469914 A    3/2015
CN    108496390 A    9/2018

OTHER PUBLICATIONS

International Search Report of PCT Application No. PCT/CN2019/073979 dated Oct. 22, 2019 with English translation, (6p).
(Continued)

*Primary Examiner* — Jean A Gelin
(74) *Attorney, Agent, or Firm* — Arch & Lake LLP; Hao Tan

(57) ABSTRACT

A method and an apparatus for detecting a downlink transmission, a method and an apparatus for transmitting configuration information, a method and an apparatus for a downlink transmission are provided. The method for detecting a downlink transmission includes: a user equipment (UE) detects a target signal of a downlink transmission within a first detection period; the UE determines whether a detection result satisfies a predetermined adjustment condition in response to detecting no target signal; and the UE extends the first detection period currently used by a physical downlink control channel to a predetermined second detection period in response to determining that the detection result satisfies the predetermined adjustment condition.

13 Claims, 10 Drawing Sheets

(51) Int. Cl.
*H04W 72/0446* (2023.01)
*H04W 72/0453* (2023.01)
*H04W 72/23* (2023.01)

(58) Field of Classification Search
CPC . H04W 72/0453; H04W 72/08; H04W 72/23; H04L 5/0051; H04L 5/0053; H04L 5/0055
USPC .......................................................... 370/329
See application file for complete search history.

(56) References Cited

U.S. PATENT DOCUMENTS

| | | | | |
|---|---|---|---|---|
| 2010/0135159 | A1* | 6/2010 | Chun | H04W 76/28 370/241 |
| 2012/0135764 | A1* | 5/2012 | Ohashi | H04L 1/0001 455/501 |
| 2012/0188207 | A1* | 7/2012 | Usukura | G09G 3/3648 345/175 |
| 2015/0055532 | A1* | 2/2015 | Lu | H04W 76/28 370/311 |
| 2015/0304854 | A1* | 10/2015 | Xu | H04W 72/0453 370/280 |
| 2016/0007252 | A1* | 1/2016 | Larmo | H04W 76/28 370/332 |
| 2016/0172989 | A1* | 6/2016 | Lee | H02H 3/247 363/21.02 |
| 2016/0173315 | A1* | 6/2016 | Klm | H04L 27/2655 375/362 |
| 2016/0302173 | A1* | 10/2016 | Feng | H04W 76/10 |
| 2017/0230975 | A1* | 8/2017 | Tanaka | H04W 72/0446 |
| 2017/0244536 | A1* | 8/2017 | Li | H04W 72/0446 |
| 2017/0265226 | A1* | 9/2017 | Yano | H04W 74/004 |
| 2018/0091242 | A1* | 3/2018 | Li | H04B 17/318 |
| 2018/0254842 | A1* | 9/2018 | Hua | H04W 52/243 |
| 2018/0324780 | A1* | 11/2018 | Novlan | H04L 43/0811 |
| 2019/0021076 | A1* | 1/2019 | Zhang | H04L 1/1812 |
| 2019/0081754 | A1* | 3/2019 | Cheng | H04L 1/1812 |
| 2019/0223044 | A1* | 7/2019 | Qin | H04W 76/15 |
| 2019/0319683 | A1* | 10/2019 | Lou | H04B 7/0452 |
| 2019/0380110 | A1* | 12/2019 | Zhang | H04W 72/04 |
| 2020/0154297 | A1* | 5/2020 | Chen | H04W 72/046 |
| 2020/0169956 | A1* | 5/2020 | Sun | H04W 72/04 |
| 2020/0267743 | A1* | 8/2020 | Kim | H04W 72/0446 |
| 2020/0343995 | A1* | 10/2020 | Shao | H04L 1/1819 |
| 2020/0344103 | A1* | 10/2020 | Jung | H04J 11/0073 |
| 2020/0359385 | A1* | 11/2020 | Tang | H04L 5/0051 |
| 2020/0383014 | A1* | 12/2020 | Chen | H04W 72/046 |
| 2020/0396723 | A1* | 12/2020 | Yang | H04W 76/28 |
| 2021/0367707 | A1* | 11/2021 | Wu | H04W 48/12 |

OTHER PUBLICATIONS

Panasonic, "DRX Procedure for NR-U", 3GPP TSG-RAN WG2 Meeting #104, R2-1817181, Spokane, USA, Nov. 16, 2018, (4p).

* cited by examiner

DOWNLINK TRANSMISSION DETECTING METHOD AND DEVICE, CONFIGURATION INFORMATION TRANSMISSION METHOD AND DEVICE, AND DOWNLINK TRANSMISSION METHOD AND DEVICE

CROSS-REFERENCE TO RELATED APPLICATION

This application is the U.S. national phase of International Application No. PCT/CN2019/073979, filed on Jan. 30, 2019, the entire contents of which are incorporated herein by reference for all purposes.

TECHNICAL FIELD

The present disclosure relates to a field of communication technology, and more particularly to a method and an apparatus for detecting a downlink transmission, a method and an apparatus for transmitting configuration information, a method and an apparatus for a downlink transmission.

BACKGROUND

In related art, a base station sends schedule information or configuration information for a user equipment (UE) to the UE via a physical downlink control channel. The UE needs to detect the physical downlink control channel. Typically, for a dynamic scheduling business, once detection is required per time slot. In an unlicensed frequency band of 5G (5th generation mobile communication system), the base station needs to obey a Listen Before Talk (LBT) principle when sending the physical downlink control channel, i.e., the base station detects whether there is idle resource for sending the physical downlink control channel, if no, then the base station would not send the physical downlink control channel for a while. In this case, the detection of the physical downlink control channel by the UE is useless, which causes a consumption of the UE's resources.

SUMMARY

The present disclosure provides a method and an apparatus for detecting a downlink transmission, a method and an apparatus for transmitting configuration information, a method and an apparatus for a downlink transmission. The technical solutions will be described as follows.

According to a first aspect of the present disclosure, a method for detecting a downlink transmission is provided. The method includes that a UE detects a target signal of a downlink transmission within a first detection period. Further, the UE determines whether a detection result satisfies a predetermined adjustment condition in response to detecting no target signal. Moreover, the UE extends the first detection period currently used by a physical downlink control channel to a predetermined second detection period in response to determining that the detection result satisfies the predetermined adjustment condition.

According to a second aspect of the present disclosure, a method for transmitting configuration information is provided. The method is applicable in a base station and includes that the base station generates configuration information of a downlink transmission, where the configuration information includes time-frequency position information of a target signal and is configured to instruct a UE to detect the target signal of the downlink transmission within a first detection period based on the time-frequency position information. Further, the method includes that the base station sends the configuration information to the UE.

According to a third aspect of the present disclosure, a method for a downlink transmission is provided. The method is applicable in a base station and includes that the base station detects whether there is an idle resource for the downlink transmission. Further, the method includes that the base station determines whether a reference signal is at a starting position of the downlink transmission in response to detecting that there is the idle resource. Moreover, the method includes that the base station sets a transmission position of a synchronization signal as the starting position of the downlink transmission in response to determining that the reference signal is not at the starting position. According to a fourth aspect of the present disclosure, an apparatus for detecting a downlink transmission is provided. The apparatus includes a processor and a memory configured to store instructions executable by the processor. Further, the processor is configured to: detect a target signal of a downlink transmission within a first detection period, determine whether a detection result satisfies a predetermined adjustment condition in response to detecting no target signal, and extend the first detection period currently used by a physical downlink control channel to a predetermined second detection period in response to determining that the detection result satisfies the predetermined adjustment condition.

According to a fifth aspect of the present disclosure, an apparatus for transmitting configuration information is provided. The apparatus includes a processor and a memory configured to store instructions executable by the processor. Further, the processor is configured to generate configuration information of a downlink transmission, where the configuration information includes time-frequency position information of a target signal and is configured to instruct a UE to detect the target signal of the downlink transmission within a first detection period based on the time-frequency position information. Moreover, the processor is configured to send the configuration information to the UE.

According to a sixth aspect of the present disclosure, an apparatus for a downlink transmission is provided. The apparatus includes a processor and a memory configured to store instructions executable by the processor. Further, the processor is configured to: detect whether there is an idle resource for the downlink transmission, determine whether a reference signal is at a starting position of the downlink transmission in response to detecting that there is the idle resource, and set a transmission position of a synchronization signal as the starting position of the downlink transmission in response to determining that the reference signal is not at the starting position.

According to a seventh aspect of the present disclosure, a computer-readable storage medium is provided. The computer-readable storage medium has computer instructions stored therein. When the computer instructions are executed by a processor, the above method at the UE side according to the first aspect is implemented.

According to an eighth aspect of the present disclosure, a computer-readable storage medium is provided. The computer-readable storage medium has computer instructions stored therein. When the computer instructions are executed by a processor, the above method for transmitting configuration information according to the second aspect is implemented.

According to a ninth aspect of the present disclosure, a computer-readable storage medium is provided. The computer-readable storage medium has computer instructions stored therein. When the computer instructions are executed by a processor, the above method for a downlink transmission according to the third aspect is implemented.

It should be understood that the above general description and the following details are explanatory and illustrative, and shall not be construed to limit the present disclosure.

BRIEF DESCRIPTION OF THE DRAWINGS

The accompanying drawings are incorporated into the disclosure as one part therein to illustrate embodiments of the present disclosure. The accompanying drawings together with the specification explain the principle of the present disclosure.

DETAILED DESCRIPTION

Figure 1:
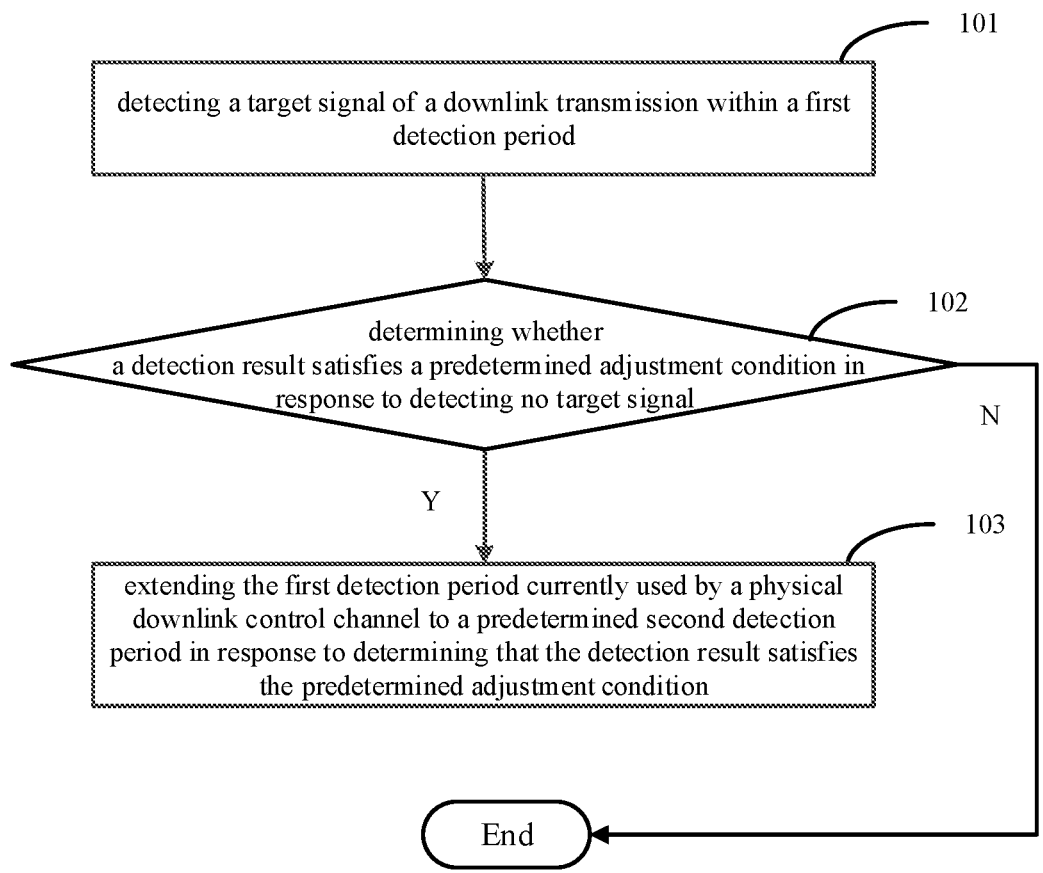
FIG. 1 is a flowchart illustrating a method for detecting a downlink transmission according to an example embodiment.

Reference will be made in detail to embodiments of the present disclosure. Throughout the descriptions with reference to the accompanying drawings, unless specified or limited otherwise, the same or similar elements and the elements are denoted by the same reference numeral in different drawings. The implementations described in the following embodiments shall not be construed to represent all implementations of the present disclosure. Rather, they are merely some examples of the apparatus and method according to some aspects of the present disclosure, as described in the claims.

In related art, a base station sends schedule information or configuration information for a user equipment (UE) to the UE via a physical downlink control channel. The UE needs to detect the physical downlink control channel. Typically, for a dynamic scheduling business, once detection is required per time slot. In an unlicensed frequency band of 5G ($5^{th}$ generation mobile communication system), the base station needs to obey an LBT (Listen Before Talk) principle when sending the physical downlink control channel, i.e., the base station detects whether there is idle resource for sending the physical downlink control channel, if no, then the base station would not send the physical downlink control channel for a while. In this case, the detection of the physical downlink control channel by the UE is useless, which causes a consumption of the UE's resources.

In order to solve the above problem, the UE may detect a target signal of a downlink transmission within a first detection period, thereby determining whether the downlink transmission is smooth, if not, the detection period of the physical downlink control channel may be extended to reduce useless detection of the physical downlink control channel, thus saving the power consumption.

FIG. 1 is a flowchart illustrating a method for detecting a downlink transmission according to an example embodiment of the present disclosure. The method can be applied in a user equipment. The user equipment may be a mobile phone, a computer, a digital broadcasting terminal, a messaging device, a game console, a tablet device, a medical device, a fitness device, a personal digital assistant, etc. As illustrated in FIG. 1, the method may include the following blocks 101-103.

At block 101, a target signal of a downlink transmission is detected within a first detection period.

At block 102, in response to detecting no target signal, it is determined whether a detection result satisfies a predetermined adjustment condition.

At block 103, in response to determining that the detection result satisfies the predetermined adjustment condition, the first detection period currently used by a physical downlink control channel is extended to a second detection period.

In the embodiment, in response to detecting the target signal, it may be determined that the downlink transmission is smooth, this process may end, and the first detection period of the physical downlink control channel is maintained. Further, when the predetermined adjustment condition is not satisfied, it may be determined that the downlink transmission is smooth, this process may end, and the first detection period of the physical downlink control channel is maintained.

The technical solution provided in the embodiment may have the following benefits. In the embodiment, the target signal of the downlink transmission is detected within the first detection period, thereby determining an effect of the downlink transmission. When the downlink transmission is not smooth, the detection period of the physical downlink control channel is extended, such that a power consumption of a user equipment may be saved, and a useless detection may be avoided.

The adjustment condition in the embodiment includes various conditions reflecting that the downlink transmission is not smooth. In an unlicensed frequency band, a major reason why the downlink transmission is not smooth is that a downlink resource is occupied by a system other than the mobile communication system, such that a base station cannot send the target signal on a time-frequency resource corresponding to the target signal. Any condition reflecting the above situation and any condition reflecting that the downlink transmission is not smooth may be used as the adjustment condition in the embodiment.

The second detection period in the embodiment may be 1.2-2 times of the first detection period, such as 1.2 times, 1.4 times, 1.5 times, 1.7 times of the first detection period, which is not limited herein.

The physical downlink control channel in the embodiment may be PDCCH.

In an embodiment, the target signal at least includes one of a downlink demodulation reference signal, a synchronization signal, and a tracking reference signal.

The technical solution provided in the embodiment may have the following benefits. In the embodiment, various target signals may be used to determine a transmission effect of the downlink transmission, which applies to multiple application scenarios and leads to more accurate determination.

Preferably, the target signal may be the downlink demodulation reference signal (DM-RS), but in another possible implementation, when there is no DM-RS, the target signal may include the synchronization signal or the tracking reference signal, which may be adjusted according to specific application scenarios and not limited herein.

In the embodiment, the UE may detect many kinds of target signals of the downlink transmission to determine whether the downlink transmission is smooth. Each kind of target signal can be used as a basis of the determination. Alternatively, many kinds of target signals can be detected, and when all kinds of the target signals satisfy the adjustment condition, the detection period of the physical downlink control channel is extended.

In an embodiment, the adjustment condition may include no target signal being detected within n consecutive first detection periods, where n is a predetermined positive integer.

In the embodiment, if the target signal is detected consecutively n times, it may be determined that the adjustment condition is satisfied, and the first detection period currently used by the physical downlink control channel is extended to the second detection period. n may be configured by the base station, for example by sending n to the UE via the RRC signaling or the like. The value of n may be any one of 1-5, for example, 2, 3, 4 etc., which is not limited herein.

The technical solution provided in the embodiment may have the following benefits. In the embodiment, a feasible adjustment condition is provided.

In an embodiment, after extending the first detection period currently used by the physical downlink control channel to the second detection period, the method further includes step A.

In step A, in response to detecting the target signal within the predetermined second detection period, the second detection period currently used by the physical downlink control channel is restored to the first detection period.

In the embodiment, after extending the first detection period currently used by the physical downlink control channel to the predetermined second detection period, the target signal of the downlink transmission may be continually detected within the first detection period. In response to detecting the target signal, it may be determined that the downlink transmission returns to smooth, such that the second detection period currently used by the physical downlink control channel is restored to the first detection period.

The technical solution provided in the embodiment may have the following benefits. In the embodiment, the detection period of the physical downlink control channel is restored when the downlink transmission returns to smooth, such that it may avoided that a downlink control message is missed.

In an embodiment, after extending the first detection period currently used by the physical downlink control channel to the second detection period, the method further includes step B.

In step B, in response to detecting no target signal within the predetermined second detection period, the second detection period is maintained.

In the embodiment, after extending the first detection period currently used by the physical downlink control channel to the predetermined second detection period, the target signal of the downlink transmission may be continually detected within the first detection period. In response to detecting no target signal, it may be determined that the downlink transmission is still not smooth, such that the second detection period is maintained, i.e., continuing in the power saving mode.

The technical solution provided in the embodiment may have the following benefits. In the embodiment, the extended detection period is maintained if the downlink transmission continues to be not smooth.

In an embodiment, step B includes step B1.

In step B1, when a wireless link is in a connected state, in response to detecting no target signal within the predetermined second detection period, the second detection period is maintained.

In the embodiment, after extending the first detection period currently used by the physical downlink control channel to the predetermined second detection period, the target signal of the downlink transmission may be continually detected within the first detection period. If no target signal is detected in case that the wireless link is in the connected state, then the second detection period may be maintained, i.e., continuing in the power saving mode.

The UE may determine whether the wireless link is in the connected state based on network factors, such as signal quality, interference condition and the like.

The technical solution provided in the embodiment may have the following benefits. In the embodiment, the extended detection period is maintained if the wireless link is not disconnected.

In an embodiment, the method may further include step C1.

In step C1, configuration information of the downlink transmission sent by the base station is received. The configuration information includes time-frequency position information of the target signal.

Block 101 may include step C2.

In step C2, the target signal of the downlink transmission is detected within the first detection period based on the time-frequency position information.

In the embodiment, the base station may send the configuration information of the downlink transmission to the UE in advance, so as to inform the UE of the time-frequency position information of the target signal. The UE may detect the target signal more accurately based on the time-frequency position information, and further determine whether the downlink transmission is smooth more accurately.

In the foregoing embodiments, once the UE detect the target signal of the downlink transmission, a count is updated and it may be determined whether the count reaches n. If the UE receives the configuration information sent by the base station during the counting process, the count continues to update and is not reset, i.e., it may be not considered that the downlink transmission returns to smooth when the UE receives the configuration information.

The technical solution provided in the embodiment may have the following benefits. In the embodiment, the user equipment may detect the target signal of the downlink transmission within the first detection period based on the configuration information sent by the base station, such that an accurate detection result may be obtained.

A specific implementation will be described with reference to the below embodiments.

Figure 2:
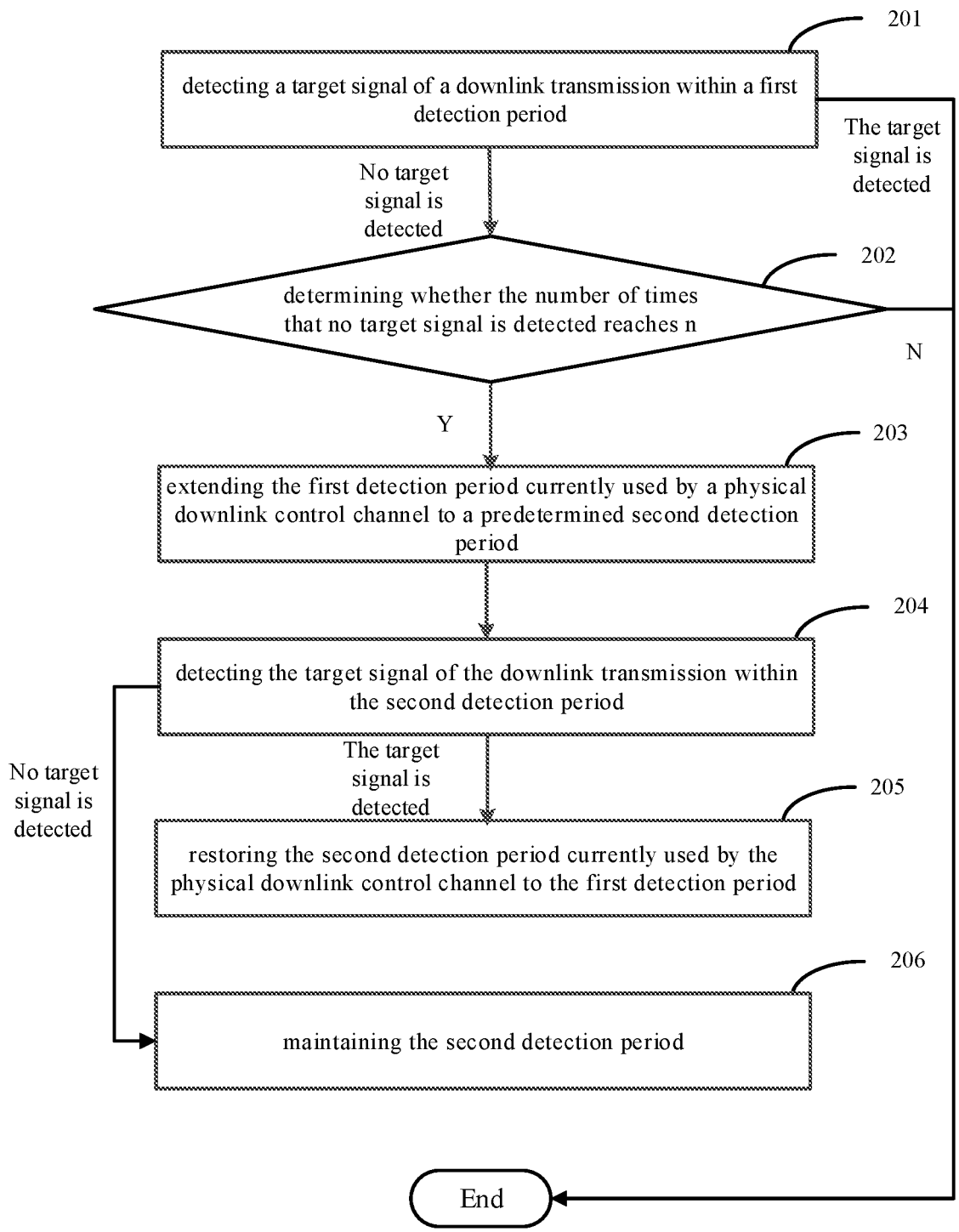
FIG. 2 is a flowchart illustrating a method for detecting a downlink transmission according to an example embodiment.

FIG. 2 is a flowchart illustrating a method for detecting a downlink transmission according to an example embodiment. The method for detecting a downlink transmission may be applied in a user equipment. The user equipment may be a mobile phone, a computer, a digital broadcasting terminal, a messaging device, a game console, a tablet device, a medical device, a fitness device, a personal digital assistant, etc. As illustrated in FIG. 2, the method may include the following blocks 201-206.

In block 201, a target signal of a downlink transmission is detected within a first detection period. In response to detecting no target signal, block 202 is executed. In response to detecting the target signal, the process ends this time, the first detection period is maintained and the process may proceed to block 201.

In block 202, it is determined whether the number of times that no target signal is detected reaches n. When the number of times reaches n, block 203 is executed. When the number of times does not reach n, the process ends this time, the first detection period is maintained and the process may proceed to block 201.

In block 203, the first detection period currently used by a physical downlink control channel is extended to a predetermined second detection period.

In block 204, the target signal of the downlink transmission is detected within the second detection period. In response to detecting the target signal, block 205 is executed. In response to detecting no target signal, block 206 is executed.

In block 205, the second detection period currently used by the physical downlink control channel is restored to the first detection period.

In block 206, the second detection period is maintained.

Figure 3:
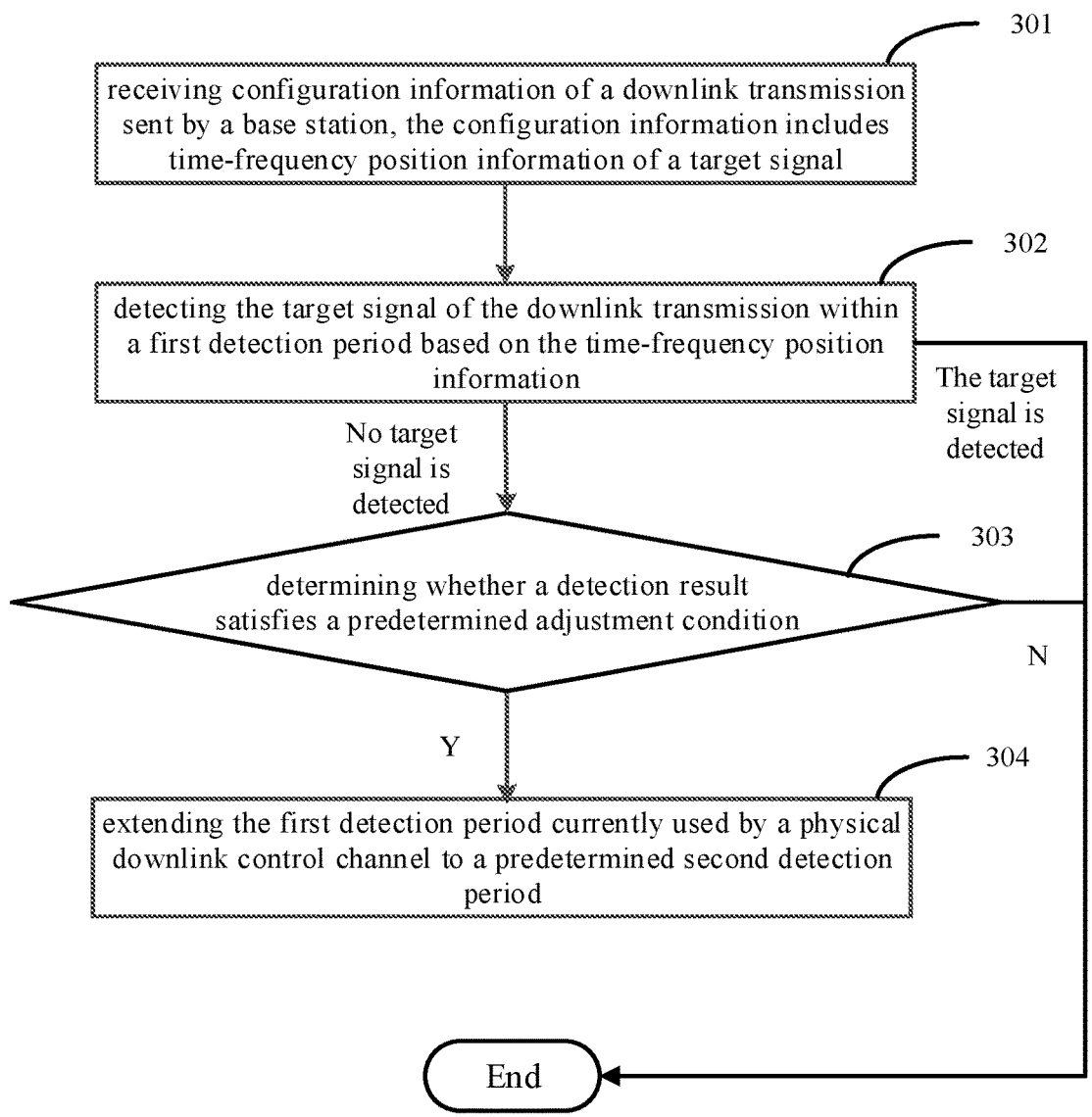
FIG. 3 is a flowchart illustrating a method for detecting a downlink transmission according to an example embodiment.

FIG. 3 is a flowchart illustrating a method for detecting a downlink transmission according to an example embodiment of the present disclosure. The method can be applied in a user equipment. The user equipment may be a mobile phone, a computer, a digital broadcasting terminal, a messaging device, a game console, a tablet device, a medical device, a fitness device, a personal digital assistant, etc. As illustrated in FIG. 3, the method may include the following blocks 301-304.

In block 301, configuration information of a downlink transmission sent by a base station is received. The configuration information includes time-frequency position information of a target signal.

In block 302, the target signal of the downlink transmission is detected within a first detection period based on the time-frequency position information. In response to detecting no target signal, block 303 is executed. In response to detecting the target signal, the process ends this time, the first detection period is maintained and the process may proceed to block 302.

In block 303, it is determined whether a detection result satisfies a predetermined adjustment condition. If yes, block 304 is executed. If no, the process ends this time, the first detection period is maintained and the process may proceed to block 302.

In block 304, the first detection period currently used by a physical downlink control channel is extended to a predetermined second detection period.

The implementation at the UE side is described above. Correspondingly, an improvement is made in the base station. An implementation in the base station will be described below.

Figure 4:
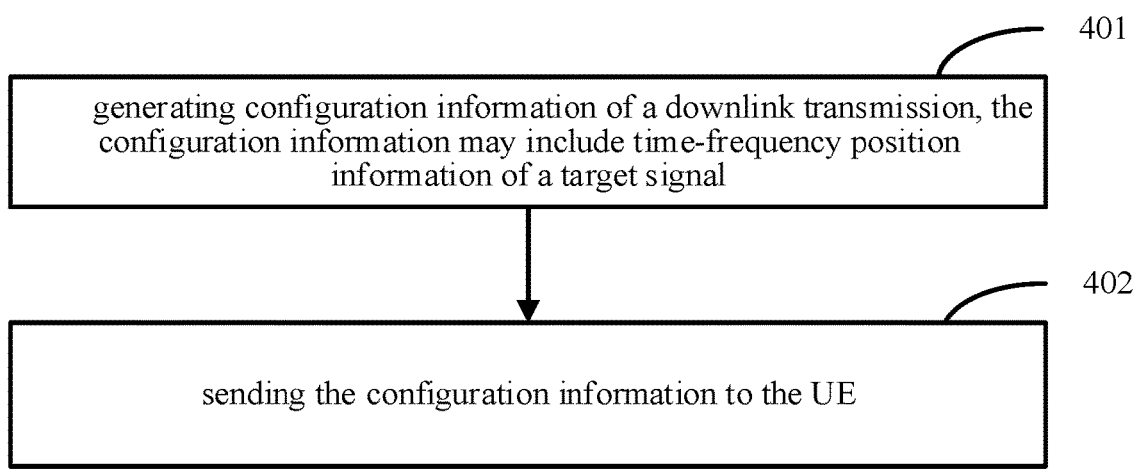
FIG. 4 is a flowchart illustrating a method for transmitting configuration information according to an example embodiment.

FIG. 4 is a flowchart illustrating a method for transmitting configuration information according to an example embodiment. The method for transmitting configuration information may be applied in an access network device, such as a base station. As illustrated in FIG. 4, the method may include the following blocks 401-402.

In block 401, configuration information of a downlink transmission is generated. The configuration information may include time-frequency position information of a target signal. The configuration information is configured to indicate a UE to detect the target signal of the downlink transmission within a first detection period based on the time-frequency position information.

In block 402, the configuration information is sent to the UE.

In the embodiment, the base station may send the time-frequency position information of the target signal to the UE, such that the UE may detect the target signal more accurately based on the time-frequency position information, which may reduce power consumption.

The technical solution provided in the embodiment may have the following benefits. In the embodiment, the base station may send the configuration information to the UE, such that the UE may detect the target signal of the downlink transmission within the first detention period more accurately.

Figure 5:
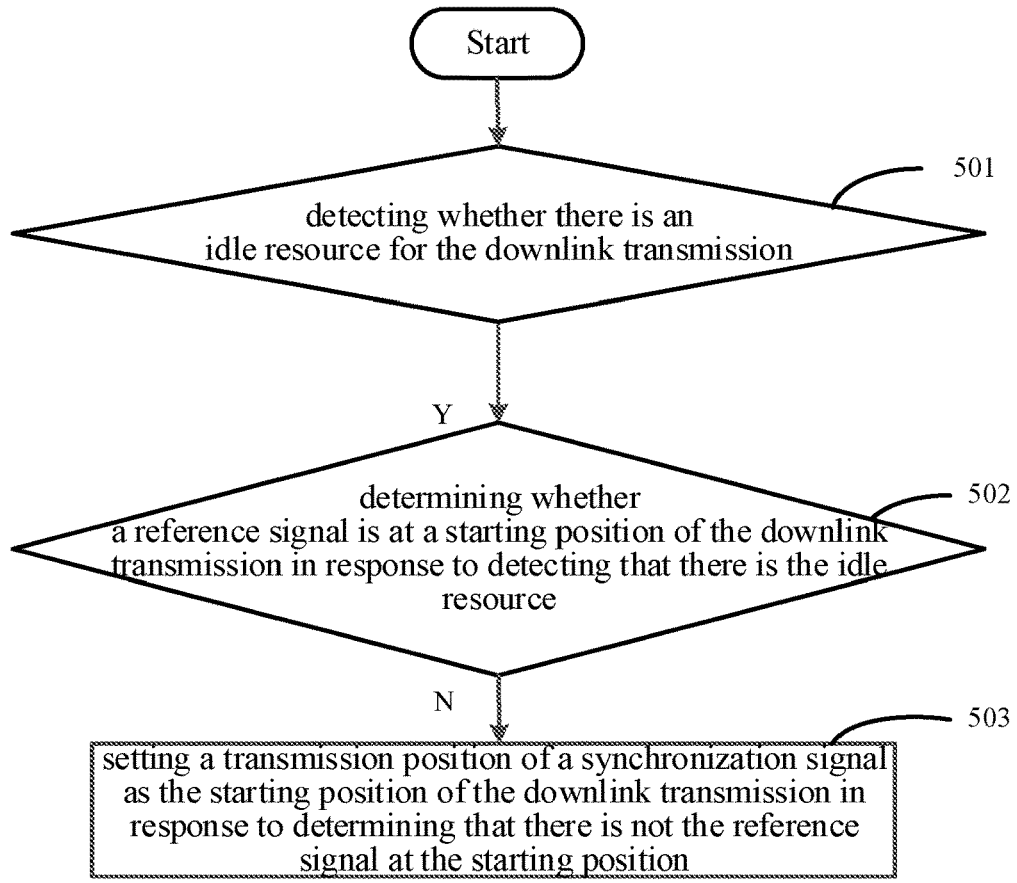
FIG. 5 is a flowchart illustrating a method for a downlink transmission according to an example embodiment.

FIG. 5 is a flowchart illustrating a method for a downlink transmission according to an example embodiment. The method for a downlink transmission may be applied in an access network device, such as a base station. In the method, a reference signal may be preferably a downlink demodulation reference signal or may be another reference signal such as a tracking reference signal. As illustrated in FIG. 5, the method may include the following blocks 501-503.

In block 501, it is detected whether there is an idle resource for a downlink transmission.

In block 502, in response to detecting that there is the idle resource, it is determined whether a reference signal is at a starting position of the downlink transmission.

In block 503, in response to determining that it is not the reference signal at the starting position, a transmission position of a synchronization signal is set as the starting position of the downlink transmission.

In the embodiment, for an unlicensed frequency band, the base station may detect whether there is the idle resource for the downlink transmission when downlink information needs to be transmitted. If yes, the downlink transmission may be performed. It is determined whether the downlink demodulation reference signal is at the starting position of the downlink transmission, if no, and then the transmission position of the synchronization signal is set as the starting position of the downlink transmission. The synchronization signal in the embodiment may function to realize synchronization as well as function as the downlink demodulation reference signal, which may facilitate determination of the starting position of the downlink transmission by the UE in a scenario where there is no downlink demodulation reference signal, such that the starting position of the downlink transmission may be detected commendably.

In the embodiment, in response to detecting that there is no idle resource, this process ends this time, and the process may proceed to block 501. In response to determining that the reference signal is at the starting position, the reference signal will be sent at the starting position.

The technical solution provided in the embodiment may have the following benefits. In the embodiment, the transmission position of the synchronization signal is determined as the starting position of the downlink transmission, such that the UE may detect the target signal of the downlink transmission within the first detention period more accurately.

The above embodiments may be combined in any way based on actual requirements.

Apparatus embodiments of the present disclosure will be described below, which may be used to execute the method embodiments.

Figure 6:
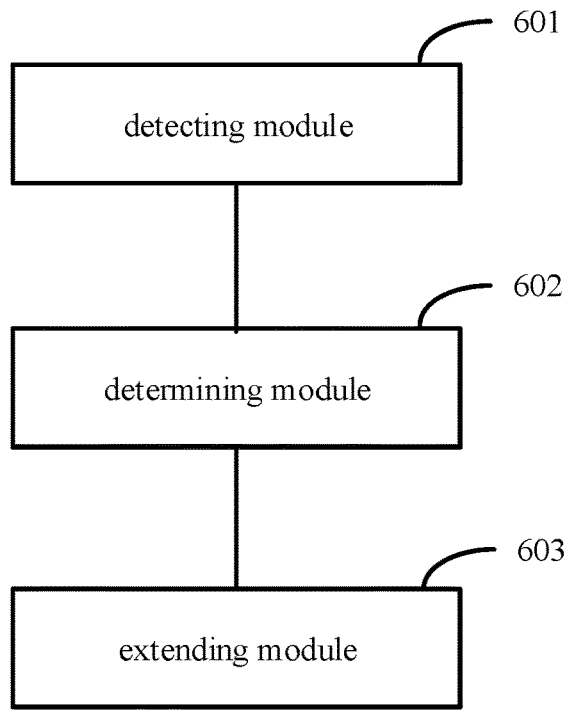
FIG. 6 is a block diagram illustrating an apparatus for detecting a downlink transmission according to an example embodiment.

FIG. 6 is a block diagram illustrating an apparatus for detecting a downlink transmission according to an example embodiment. The apparatus may be implemented as a part or all of an electronic device by hardware, software or a combination thereof. The apparatus may be applied in user equipment. With reference to FIG. 6, the apparatus may include a detecting module 601, a determining module 602 and an extending module 603.

The detecting module 601 is configured to detect a target signal of a downlink transmission within a first detection period.

The determining module 602 is configured to determine whether a detection result satisfies a predetermined adjustment condition in response to detecting no target signal.

The extending module 603 is configured to extend the first detection period currently used by a physical downlink control channel to a predetermined second detection period in response to determining that the detection result satisfies the predetermined adjustment condition.

In an embodiment, the target signal at least includes one of a downlink demodulation reference signal, a synchronization signal, and a tracking reference signal.

In an embodiment, the adjustment condition includes no target signal being detected within n consecutive first detection periods, where n is a predetermined positive integer.

Figure 7:
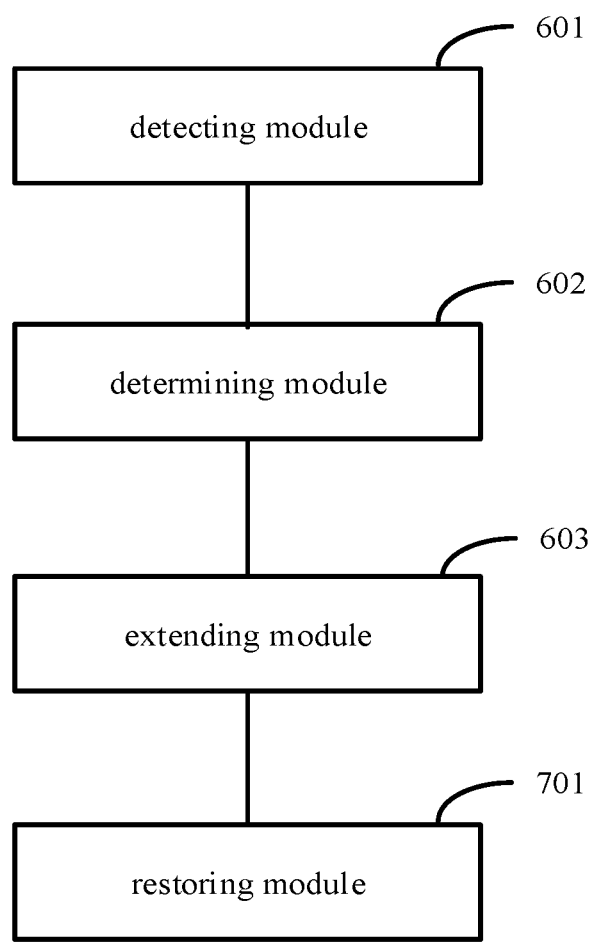
FIG. 7 is a block diagram illustrating an apparatus for detecting a downlink transmission according to an example embodiment.

In an embodiment, as illustrated in FIG. 7, the apparatus may further include a restoring module 701.

The restoring module 701 is configured to restore the second detection period currently used by the physical downlink control channel to the first detection period in response to detecting the target signal within the predetermined second detection period.

Figure 8:
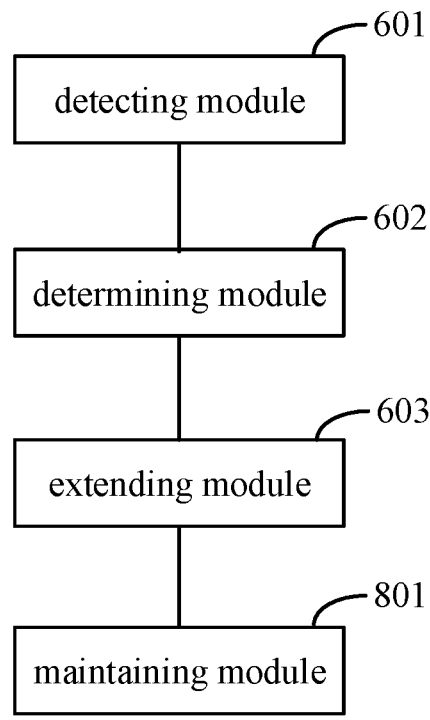
FIG. 8 is a block diagram illustrating an apparatus for detecting a downlink transmission according to an example embodiment.

In an embodiment, as illustrated in FIG. 8, the apparatus may further include a maintaining module 801.

The maintaining module 801 is configured to maintain the second detection period in response to detecting no target signal within the predetermined second detection period.

Figure 9:
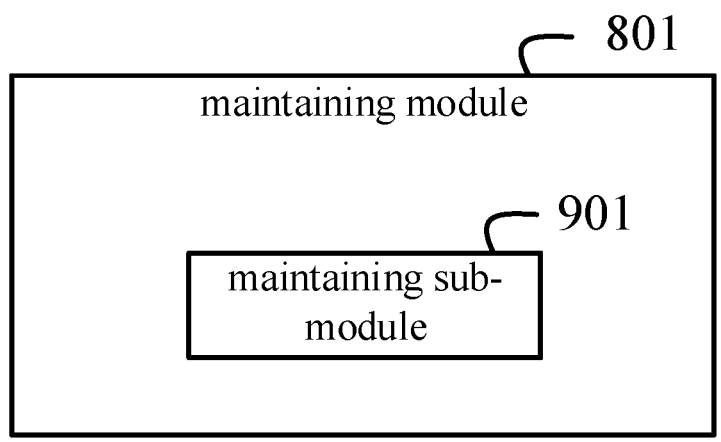
FIG. 9 is a block diagram illustrating a maintaining module according to an example embodiment.

In an embodiment, as illustrated in FIG. 9, the maintaining module 801 may further include a maintaining sub-module 901.

The maintaining sub-module 901 is configured to maintain the second detection period in response to detecting no target signal within the predetermined second detection period when a wireless link is in a connected state.

Figure 10:
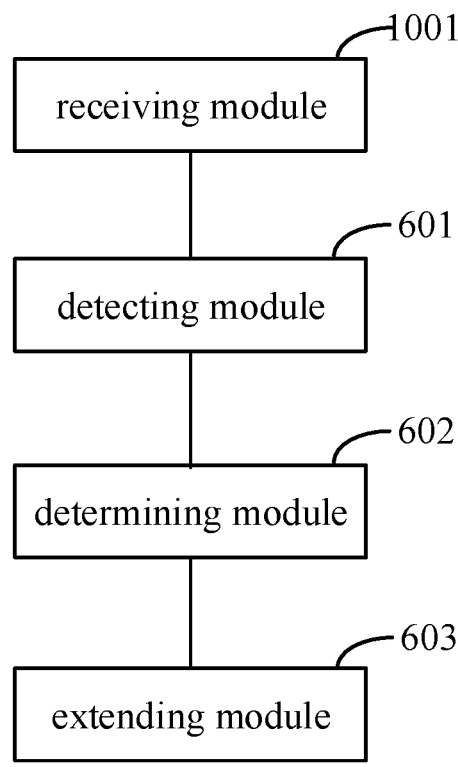
FIG. 10 is a block diagram illustrating an apparatus for detecting a downlink transmission according to an example embodiment.

In an embodiment, as illustrated in FIG. 10, the apparatus may further include a receiving module 1001.

The receiving module 1001 is configured to receive configuration information of the downlink transmission sent by a base station. The configuration information includes time-frequency position information of the target signal.

Figure 11:
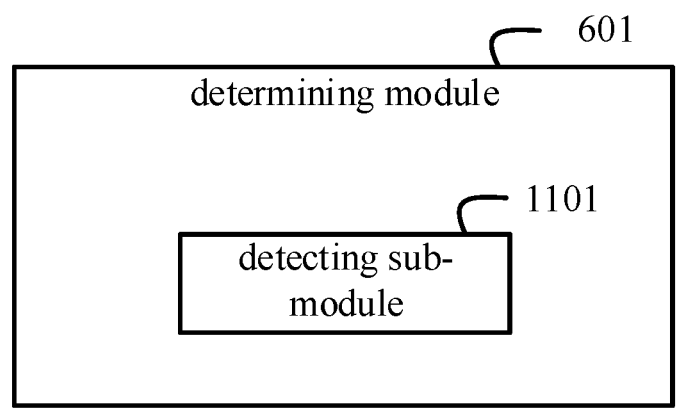
FIG. 11 is a block diagram illustrating a detecting module according to an example embodiment.

As illustrated in FIG. 11, the detecting module 601 includes a detecting sub-module 1101.

The detecting sub-module 1101 is configured to detect the target signal of the downlink transmission within the first detection period based on the time-frequency position information.

Figure 12:
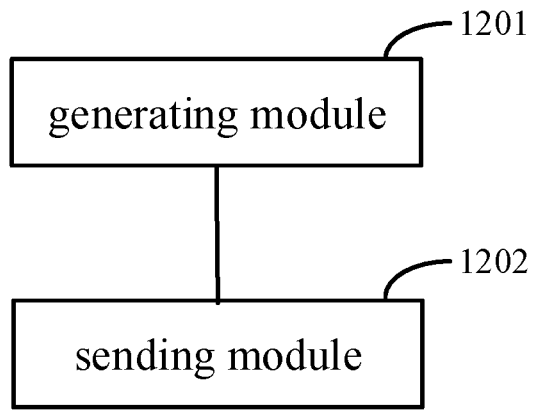
FIG. 12 is a block diagram illustrating an apparatus for transmitting configuration information according to an example embodiment.

FIG. 12 is a block diagram illustrating an apparatus for transmitting configuration information according to an example embodiment. The apparatus may be implemented as a part or all of an electronic device by hardware, software or a combination thereof. The apparatus may be applied in a base station. With reference to FIG. 12, the apparatus may include a generating module 1201 and a sending module 1202.

The generating module 1201 is configured to generate configuration information of a downlink transmission, in which the configuration information includes time-frequency position information of a target signal and is configured to indicate a UE to detect the target signal of the downlink transmission within a first detection period based on the time-frequency position information.

The sending module 1202 is configured to send the configuration information to the UE.

Figure 13:
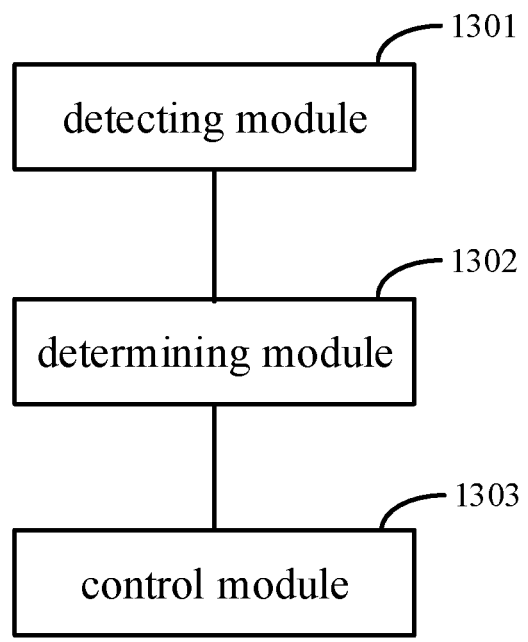
FIG. 13 is a block diagram illustrating an apparatus for a downlink transmission according to an example embodiment.

FIG. 13 is a block diagram illustrating an apparatus for a downlink transmission according to an example embodiment. The apparatus may be implemented as a part or all of an electronic device by hardware, software or a combination thereof. The apparatus may be applied in a base station. With reference to FIG. 13, the apparatus may include a detecting module 1301, a determining module 1302 and a control module 1303.

The detecting module 1301 is configured to detect whether there is an idle resource for the downlink transmission.

The determining module 1302 is configured to determine whether a reference signal is at a starting position of the downlink transmission in response to detecting that there is the idle resource.

The control module 1303 is configured to set a transmission position of a synchronization signal as the starting position of the downlink transmission in response to determining that there is not the reference signal at the starting position.

In the embodiment, the reference signal may be preferably a downlink demodulation reference signal or may be another reference signal such as a tracking reference signal.

With respect to the apparatus according to the embodiment described above, the ways to perform operations by respective modules have been described in the associated method embodiments, which are not described here.

Figure 14:
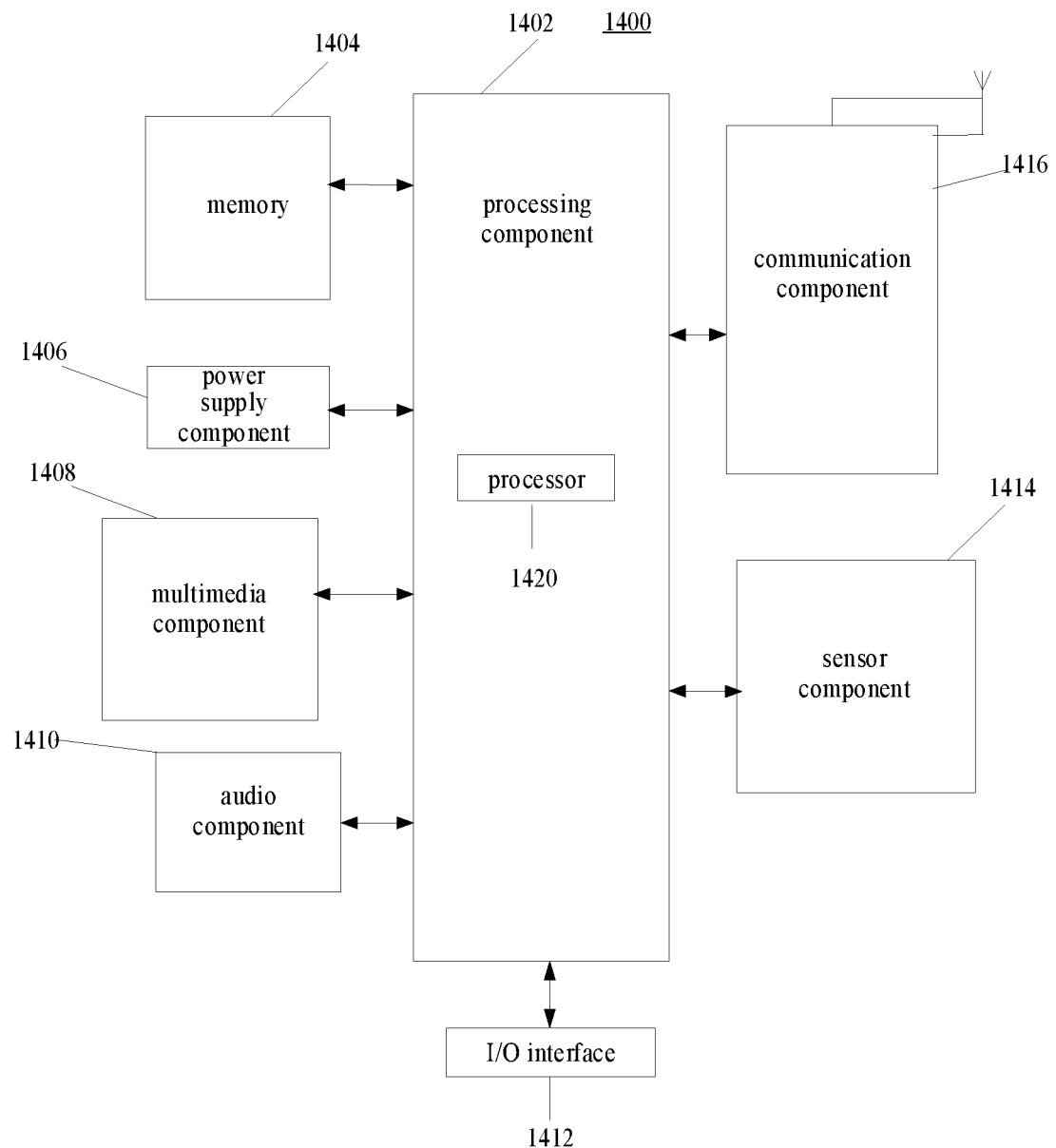
FIG. 14 is a block diagram illustrating a device applicable to detect a downlink transmission according to an example embodiment.

FIG. 14 is a block diagram of a device applicable to detect a downlink transmission according to an example embodiment. For example, the device 1400 can be a mobile phone, a computer, a digital broadcasting terminal, a messaging device, a game console, a tablet device, a medical device, a fitness device, a personal digital assistant, etc.

The device 1400 may include one or more of the following components: a processing component 1402, a memory 1404, a power supply component 1406, a multimedia component 1408, an audio component 1410, an input/output (I/O) interface 1412, a sensor component 1414, and a communication component 1416.

The processing component 1402 typically controls overall operations of the control device 1400, such as the operations associated with display, telephone calls, data communications, camera operations, and recording operations. The processing component 1402 may include one or more processors 1420 to execute instructions to perform all or part of the steps in the above described methods. In addition, the processing component 1402 may include one or more modules to facilitate the interaction between the processing component 1402 and other components. For example, the processing component 1402 may include a multimedia module to facilitate the interaction between the multimedia component 1408 and the processing component 1402.

The memory 1404 is configured to store various types of data to support operations on the device 1400. Examples of these data include instructions for any application or method operating on the device 1400, such as contact data, phone book data, messages, pictures, videos, and so on. The memory 1404 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 1406 provides power for various components of the device 1400. The power component 1406 may include a power management system, one or more power supplies, and other components associated with the generation, management, and distribution of power for the device 1400.

The multimedia component 1408 includes a screen that provides an output interface between the device 1400 and the user. In some embodiments, the screen may include a liquid crystal display (LCD) and a touch panel (TP). If the screen includes a touch panel, the screen may be used as a touch screen to receive input signals from the user. The touch panel includes one or more touch sensors to sense touch, slide, and gestures on the touch panel. The touch sensor may not only sense the boundary of a touch or slide action, but also detect the duration and pressure related to the touch or slide operation. In some embodiments, the multimedia component 1408 includes a front camera and/or a rear camera. When the device 1400 is in an operation mode, such as a shooting mode or a video mode, the front camera and/or the rear camera may receive external multimedia data. Each of the front camera and the rear camera may be a fixed optical lens system or have focus and optical zoom capability.

The audio component 1410 is configured to output and/or input audio signals. For example, the audio component 1410 includes a microphone (MIC). When the device 1400 is in an operation mode, such as a call mode, a recording mode, and a voice recognition mode, the microphone is configured to receive external audio signals. The received audio signal may be further stored in the memory 1404 or transmitted via the communication component 1416. In some embodiments, the audio component 1410 further includes a speaker to output audio signals.

The I/O interface 1412 provides an interface between the processing component 1402 and the peripheral interface module. The peripheral interface module may be a keyboard, a click wheel, a button, and so on. These buttons may include but are not limited to: home button, volume button, start button, and lock button.

The sensor component 1414 includes one or more sensors to provide status assessments of various aspects of the device 1400. For example, the sensor component 1414 may detect the On/Off state of the device 1400 and relative position of components, for example, components as the display and the keypad of the device 1400. The sensor component 1414 may also detect changes of the position of the device 1400 or one component of the device 1400, and the presence or absence of contact between a user and the device 1400, the position or acceleration/deceleration of the device 1400, and the temperature change of the device 1400. The sensor component 1414 may include a proximity sensor configured to detect the presence of nearby objects without any physical contact. The sensor component 1414 may also include a light sensor, such as a CMOS or CCD image sensor for the imaging applications. In some embodiments, the sensor component 1414 may also include an accelerometer sensor, a gyroscope sensor, a magnetic sensor, a pressure sensor, or a temperature sensor.

The communication component 1416 is configured to facilitate wired or wireless communication between the device 1400 and other devices. The device 1400 may get access to a wireless network based on the communication standard, such as WiFi, 2G or 3G, or their combinations. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module can be implemented based on Radio Frequency Identification (RFID) technology, Infrared Data Association (IrDA) technology, Ultra-Wide Band (UWB) technology, Blue Tooth (BT) technology and other technologies.

In an exemplary embodiment, the device 1400 may be implemented by one or more application specific integrated circuits (ASIC), digital signal processors (DSP), digital signal processing devices (DSPD), programmable logic devices (PLD), field-programmable gate array (FPGA), controller, micro-controller, microprocessor, or other electronic components, for performing the above methods.

In another exemplary embodiment, there is also provided a non-transitory computer-readable storage medium including instructions, such as included in the memory 1404, executable by the processor 1420 in the device 1400, for performing the above methods. For example, the computer-readable storage medium may be a Read-Only Memory (ROM), a Random Access Memory (RAM), a CD-ROM, a magnetic tape, a floppy disk, an optical data, a storage devices, etc. When the instructions in the storage medium are executed by the processor of the electronic device, the electronic device can execute the above method.

In an example embodiment, an apparatus for detecting a downlink transmission is provided. The apparatus includes a processor, and a memory configured to store instructions executable by the processor. The processor is configured to detect a target signal of a downlink transmission within a first detection period, determine whether a detection result satisfies a predetermined adjustment condition in response to detecting no target signal, and extend the first detection period currently used by a physical downlink control channel to a predetermined second detection period in response to determining that the detection result satisfies the predetermined adjustment condition.

The above processor is further configured to be that: the target signal at least includes one of a downlink demodulation reference signal, a synchronization signal, and a tracking reference signal.

The above processor is further configured to be that: the adjustment condition includes no target signal being detected within n consecutive first detection periods, where n is a predetermined positive integer.

The above processor is further configured to, after extending the first detection period currently used by the physical downlink control channel to the second detection period, restore the second detection period currently used by the physical downlink control channel to the first detection period in response to detecting the target signal within the predetermined second detection period.

The above processor is further configured to, after extending the first detection period currently used by the physical downlink control channel to the second detection period, maintain the second detection period in response to detecting no target signal within the predetermined second detection period.

The above processor is further configured to maintain the second detection period in response to detecting no target signal within the predetermined second detection period by maintaining the second detection period in response to detecting no target signal within the predetermined second detection period when a wireless link is in a connected state.

The above processor is further configured to receive configuration information of the downlink transmission sent by a base station. The configuration information includes time-frequency position information of the target signal. The above processor is further configured to detect the target signal of the downlink transmission within the first detection period by detecting the target signal of the downlink transmission within the first detection period based on the time-frequency position information.

A computer-readable storage medium is provided. When instructions in the storage medium are executed by a processor of an apparatus, the apparatus is caused to implement the above method for detecting a downlink transmission. The method includes detecting a target signal of a downlink transmission within a first detection period, determining whether a detection result satisfies a predetermined adjustment condition in response to detecting no target signal, and extending the first detection period currently used by a physical downlink control channel to a second detection period in response to determining that the detection result satisfies the predetermined adjustment condition.

The target signal at least includes one of a downlink demodulation reference signal, a synchronization signal, and a tracking reference signal.

The adjustment condition includes no target signal being detected within n consecutive first detection periods, where n is a predetermined positive integer.

After extending the first detection period currently used by the physical downlink control channel to the second detection period, the method further includes restoring the second detection period currently used by the physical downlink control channel to the first detection period in response to detecting the target signal within the predetermined second detection period.

After extending the first detection period currently used by the physical downlink control channel to the second detection period, the method further includes maintaining the second detection period in response to detecting no target signal within the predetermined second detection period.

Maintaining the second detection period in response to detecting no target signal within the predetermined second detection period includes maintaining the second detection period in response to detecting no target signal within the predetermined second detection period when a wireless link is in a connected state.

The method further includes receiving configuration information of the downlink transmission sent by a base station. The configuration information includes time-frequency position information of the target signal. Detecting the target signal of the downlink transmission within the first detection period includes detecting the target signal of the downlink transmission within the first detection period based on the time-frequency position information.

Figure 15:
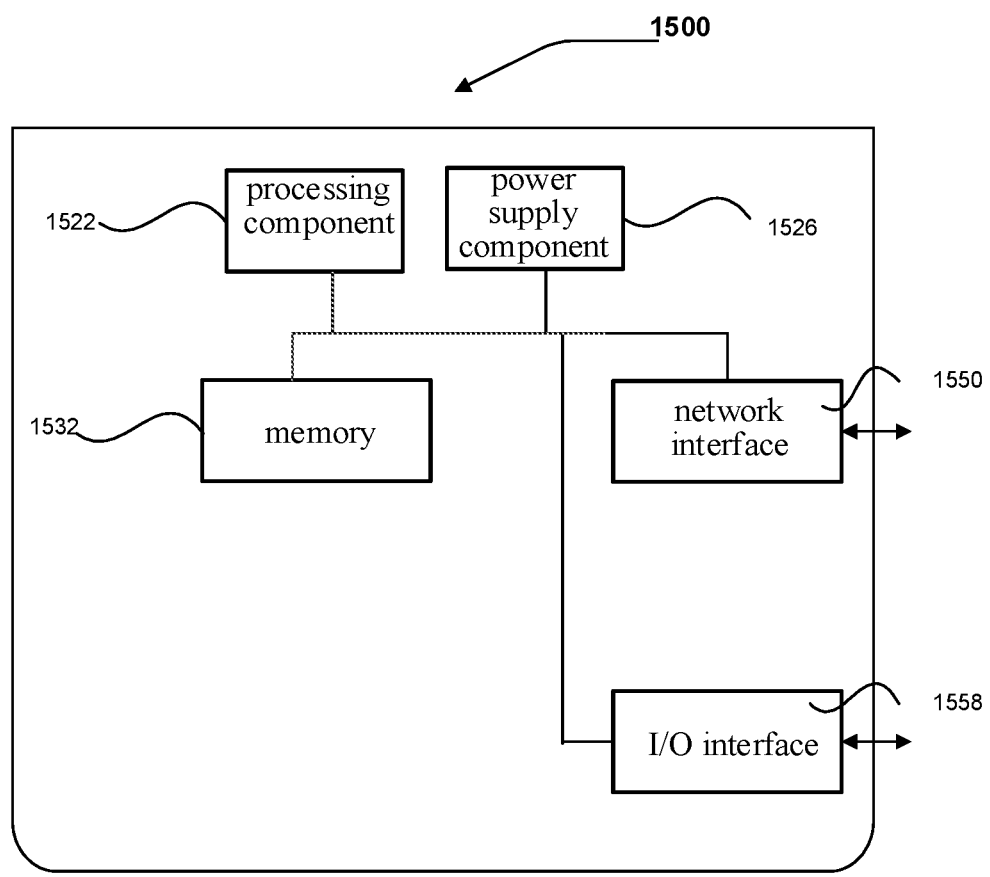
FIG. 15 is a block diagram illustrating a device applicable to transmit configuration information and to a downlink transmission according to an example embodiment.

FIG. 15 is a block diagram illustrating a device 1500 applicable for transmit configuration information and to a downlink transmission according to an example embodiment. For example, the device 1500 may be provided as a computer. Referring to FIG. 15, the device 1500 may include a processing component 1522, which further includes one or more processors, and a memory resource represented by memory 1532 for storing instructions executable by the processing component 1522, such as application programs. The application program stored in the memory 1532 may include one or more modules each corresponding to a set of instructions. In addition, the processing component 1522 is configured to execute instructions to perform the above method for accessing a network, or all or part of the steps executed by the terminal or the smart home device.

The device 1500 may further include a power supply component 1526 configured to perform power management of the device 1500, a wired or wireless network interface 1550 configured to connect the device 1500 to the network, and an input and output (I/O) interface 1538. The device 1500 could operate based on an operating system stored in the memory 1532, such as Windows Server™, Mac OS X™, Unix™, Linux™, FreeBSD™ or the like.

In an example embodiment, an apparatus for transmitting configuration information is provided. The apparatus includes a processor, and a memory configured to store instructions executable by the processor. The processor is configured to generate configuration information of a downlink transmission, in which the configuration information includes time-frequency position information of a target signal and is configured to indicate a UE to detect the target signal of the downlink transmission within a first detection period based on the time-frequency position information; and send the configuration information to the UE.

A computer-readable storage medium is provided. When instructions in the storage medium are executed by a processor of an apparatus, the apparatus is caused to implement the above method for detecting a downlink transmission. The method includes generating configuration information of a downlink transmission, in which the configuration information includes time-frequency position information of a target signal and is configured to indicate a UE to detect the target signal of the downlink transmission within a first detection period based on the time-frequency position information; and sending the configuration information to the UE.

In an example embodiment, an apparatus for a downlink transmission is provided. The apparatus includes a processor, and a memory configured to store instructions executable by the processor. The processor is configured to detect whether there is an idle resource for the downlink transmission, determine whether a reference signal is at a starting position of the downlink transmission in response to detecting that there is the idle resource, and set a transmission position of a synchronization signal as the starting position of the downlink transmission in response to determining that there is not the reference signal at the starting position.

A computer-readable storage medium is provided. When instructions in the storage medium are executed by a processor of an apparatus, the apparatus is caused to implement the above method for detecting a downlink transmission. The method includes detecting whether there is an idle resource for the downlink transmission, determining whether a reference signal is at a starting position of the downlink transmission in response to detecting that there is the idle resource, and setting a transmission position of a synchronization signal as the starting position of the downlink transmission in response to determining that there is not the reference signal at the starting position.

Those skilled in the art will easily think of other embodiments of the present disclosure after considering the specification and practicing the present disclosure. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are pointed out by the appended claims.

It should be understood that the present disclosure is not limited to the precise structure that has been described above and shown in the drawings, and various modifications and changes may be made without departing from its scope. The scope of the present disclosure is only limited by the appended claims.

What is claimed is:

1. A method for detecting a downlink transmission, comprising:
   receiving configuration information of the downlink transmission sent by a base station, wherein the configuration information comprises time-frequency position information of the target signal;
   detecting, by a user equipment (UE), a target signal of a downlink transmission within a first detection period based on the time-frequency position information, wherein the target signal comprises at least one of following signals: a downlink demodulation reference signal, a synchronization signal, or a tracking reference signal;
   determining, by the UE, whether a detection result satisfies a predetermined adjustment condition in response to detecting no target signal; and
   extending, by the UE, the first detection period currently used by a physical downlink control channel to a predetermined second detection period in response to determining that the detection result satisfies the predetermined adjustment condition.

2. The method of claim 1, wherein the adjustment condition comprises:
   no target signal is detected within n consecutive first detection periods, wherein n is a predetermined positive integer.

3. The method of claim 1, further comprising:
   restoring the second detection period currently used by the physical downlink control channel to the first detection period in response to detecting the target signal within the predetermined second detection period.

4. The method of claim 1, further comprising:
   maintaining the second detection period in response to detecting no target signal within the predetermined second detection period.

5. The method of claim 4, wherein maintaining the second detection period in response to detecting no target signal within the predetermined second detection period comprises:
   in response to determining a wireless link is in a connected state, maintaining the second detection period in response to detecting no target signal within the predetermined second detection period.

6. An apparatus for detecting a downlink transmission, comprising:
   a processor; and
   a memory configured to store instructions executable by the processor,
   wherein the processor is configured to perform the method according to claim 1.

7. A non-transitory computer-readable storage medium, having computer instructions stored thereon, wherein when the computer instructions are executed by a processor, the method according to claim 1 is implemented.

8. A method for transmitting configuration information, comprising:
   generating, by a base station, configuration information of a downlink transmission, wherein the configuration information comprises time-frequency position information of a target signal and is configured to instruct a user equipment (UE) to detect the target signal of the downlink transmission within a first detection period based on the time-frequency position information, wherein it is determined by the UE whether a detection result satisfies a predetermined adjustment condition in response to detecting no target signal in the first detection period; and the first detection period currently used by a physical downlink control channel is extended by the UE to a predetermined second detection period in response to determining that the detection result satisfies the predetermined adjustment condition, wherein the target signal comprises at least one of following signals: a downlink demodulation reference signal, a synchronization signal, or a tracking reference signal; and
   sending, by the base station, the configuration information to the UE.

9. An apparatus for transmitting configuration information, comprising:
   a processor; and
   a memory configured to store instructions executable by the processor,
   wherein the processor is configured to perform the method according to claim 8.

10. A non-transitory computer-readable storage medium, having computer instructions stored thereon, wherein when the computer instructions are executed by a processor, the method according to claim 8 is implemented.

11. A method for a downlink transmission, comprising:
    detecting, by a base station, whether there is an idle resource for the downlink transmission;
    determining, by the base station, whether a reference signal is at a starting position of the downlink transmission in response to detecting that there is the idle resource;

sending, by the base station, the reference signal at the starting position in response to determining that the reference signal is at the starting position; and setting, by the base station, a transmission position of a synchronization signal as the starting position of the downlink transmission in response to determining that the reference signal is not at the starting position.

12. An apparatus for a downlink transmission, comprising:
   a processor; and
   a memory configured to store instructions executable by the processor,
   wherein the processor is configured to perform the method according to claim 11.

13. A non-transitory computer-readable storage medium, having computer instructions stored thereon, wherein when the computer instructions are executed by a processor, the method according to claim 11 is implemented.

* * * * *